United States Patent Office 3,359,176
Patented Dec. 19, 1967

3,359,176
CERAMIC FUEL ELEMENT FOR A GAS-COOLED NUCLEAR REACTOR INCLUDING A METALLIC FUEL CONTAINER PROVIDED WITH AN OXIDATION RESISTANT COATING
John Edward Antill, Harwell, near Didcot, England, assignor to United Kingdom Atomic Energy Authority, London, England
No Drawing. Filed Jan. 10, 1966, Ser. No. 521,482
Claims priority, application Great Britain, Jan. 22, 1965, 3,042/65
5 Claims. (Cl. 176—82)

ABSTRACT OF THE DISCLOSURE

A fuel element for a gas-cooled nuclear reactor of the type having carbon dioxide as its coolant, wherein the fuel element comprises a ceramic nuclear fuel material housed in a non-fissile metal container which is made from the group of alloys comprising iron-based alloys and nickel-based, iron-containing alloys, the container also including a thin outer coating of an oxidation resistant material e.g. aluminium.

---

The present invention relates to fuel elements for nuclear reactors and is particularly concerned with the container for the fuel material of such fuel elements.

It will be known that the fuel elements for most nuclear reactors consist essentially of a fuel material in a suitable metal container. The major exception to this is the high temperature gas cooled (HTGC) reactor, which may operate with a coolant gas outlet temperature of about 750° C. at which temperature it has not hitherto been considered possible to use a metallic container for the fuel. The metallic container may be a preformed can into which the fuel is placed or the container may be in the form of a cladding round the fuel material. For example, in a plate fuel element, the container is in the form of a cladding applied to a sheet of fuel material by a picture frame rolling technique. The term "container" as used herein includes the cladding of such fuel element.

In the advanced gas cooled reactor (AGR) the fuel material presently consists of pellets of uranium dioxide and the fuel container is in the form of a can, the presently preferred material for the can being stainless steel. It will be realised however that ceramic materials other than uranium dioxide could be used as the fuel material, e.g. uranium carbide, plutonium carbide, or mixtures thereof. The mean fuel element surface temperature in the AGR is presently about 650–700° C. with "hot spots" having temperatures up to about 750° C. and this gives a coolant gas outlet temperature of 500–575° C., which although higher than the outlet from previous reactor types, is nevertheless comparatively low for modern steam raising plant.

It is the object of the present invention to provide a new or improved container which is particularly suitable for an AGR fuel element.

According to the present invention a container for the fuel material of a nuclear reactor fuel element is provided with an outer coating of oxidation resistant material.

It should be appreciated that the coating is thin relative to the thickness of the container which in many cases is of the order of 400 microns.

Suitable oxidation resistant materials for the outer coating include silicon, chromium, nickel and aluminium whilst some oxides, preferably mixed oxides, and glasses might also be used.

A suitable thickness for the outer coating is in the range 10–40 microns, and a thickness in the range 15–25 microns may be preferred in most cases. Thus, using an aluminium coating on a nickel based alloy of the EPE series, a coating thickness of 20 microns has given adequate protection against oxidation.

It will be realised that the maximum operational temperature which may be attained in a nuclear reactor using a fuel with a metal container is determined by one or more of a number of factors which include the melting point of the fuel, the melting point of the container and the reaction between the container and the reactor coolant. In certain reactor types it is, in fact, the reaction between the container and the coolant which determines the maximum operational temperature, and in the AGR reaction between the 20–25 stainless steel can and the carbon dioxide/carbon monoxide coolant becomes excessive at temperatures much above 800° C. and thus the maximum temperature permissible at present in an AGR is about 800° C. It will be appreciated that this is only a little above the temperature of the "hot spots" on the present can surface.

If the container is provided with a coating of an oxidation resistant material however, it is possible to raise the operational temperature of the fuel element to a higher level than has been possible hitherto. Thus, with an AGR type of fuel, if the container material is 20–25 stainless steel and a suitable oxidation resistant coating is provided, the maximum possible temperature may be raised from about 800° C. to a temperature in the range 900–1000° C. without there being any appreciable oxidation of the container by the mixed carbon dioxide/carbon monoxide coolant of this type of reactor.

The increased fuel element surface temperature attainable in the AGR by the use of an oxidation resistant coating may be exploited in one or both of two possible ways. Retaining the same core size, the coolant outlet temperature could be raised, and outlet temperatures of about 750° C. or more (equivalent to the proposed HTGC outlet temperature) might be attained in this manner. Alternatively, the core size could be reduced and the coolant outlet temperature maintained at its present level. It will be appreciated that the two effects could be combined, giving a reduction in core size with an increase in outlet temperature, and that this could result in the optimum conditions to give the most economic operation of the reactor.

The suitability of the coating for giving protection is dependent on the nature of the fuel container and also, to a lesser extent on the particular coolant used since, in general, if a coating is effective in giving oxidation protection in one coolant, it will also be effective in the other coolants. The nature of the base is important since a coating may give protection to one base material but not another. The reason for this is in part due to compatibility of the two materials and also on the thermal expansions of the two materials. Thus, nickel, although providing oxidation resistance would be ineffective on a stainless steel container since the nickel coating would diffuse into the container, nickel being soluble in stainless steel. This problem would not be experienced with aluminium on stainless steel but an aluminium coating is not effective in providing corrosion resistance since we have found that the aluminium coating on the stainless steel flakes off after a high temperature treatment and this appears to be due to the considerable difference between the terminal expansions of the two materials. Aluminium has however proved to be an effective coating material on nickel based alloys such as those of the EPE series, and should also be effective on other nickel based alloys such as those known as Hastelloys and Nimonics. We have found that an aluminium coating on a nickel based alloy interacts with the material of the container and forms an intermetallic aluminium coating compound which is insoluble in the material of the container and it is this intermetallic compound which appears to give the required oxidation protection. Accordingly, the term "aluminium" as used herein in relation to oxidation resistant coatings includes such intermetallic compounds where appropriate and similarly with the other metals the name of the metal includes intermetallic compounds containing the metal when these are formed. In one example of an aluminium coating on a nickel based alloy, the intermetallic compound was found to contain 40% by weight of aluminium, the remainder consisting of the components of the base alloy.

Diffusion of the coating material into the container may be prevented by the use of a suitable thin interlayer of a material which will act as a diffusion barrier, for example, nickel might be used as a protective coating on stainless steel using an interlayer of porous alumina, which interlayer could be produced by flame spraying. The alumina interlayer although permeable to gas would prevent nickel diffusion.

Thus the essential requirement of any coating material is that it should be compatible with the container material without diffusing into it and also that no flaking of the coating should occur due to stresses set up by different thermal expansions. For use in a nuclear reactor, however, it is desirable that the coating should have a low neutron capture cross section, although, since the coating will be thin compared to the container itself, the effect of the coating on the neutron absorption properties of the container will normally be negligible. Furthermore, since the container is subjected to strain, it is desirable that a suitable coating should be able to withstand these strains. We have found however that an aluminising treatment on a nickel based alloy provides protection against oxidation.

If the fuel element container is provided with fins to facilitate heat transfer, the protective layer is conveniently applied to the fins also and thus provides oxidation protection not only to the fuel element container, but also the heat transfer fins and any compatible braze material used to secure such fins to the fuel element container.

The coating may be applied to the container using any suitable technique, for example, by vapour phase deposition or electroplating.

An embodiment of the present invention is set out in the following example.

*Example*

A nickel based alloy of the EPE series having a nominal composition of iron, 33–37%; chromium, 16–18%; molybdenum, 3.5%; titanium, 1%; aluminium, 1%; the rest nickel was used in the experiment. Three uncoated samples of this alloy and one coated sample of the alloy were oxidised at one atmosphere pressure in each of carbon dioxide and a mixture of carbon dioxide and 10% by volume of carbon monoxide at a temperature of 900° C. for 6000 hours. The coated sample had been aluminised by vapour deposition to give an aluminium containing layer 20 microns thick. It was found that the attack on the coated specimen was less than that on the uncoated specimens. Metallographic examination revealed that for the uncoated samples there was considerable intergranular attack which reached a depth of 50–250 microns.

The coating on the aluminised samples was found to have flaked off in places but even in these areas the intergranular attack did not exceed a depth of 13 microns. This suggests that the aluminium may have produced some degree of oxidation resistance in the underlying metal but this is uncertain since the time at which the flaking occurred was not known. In the areas where the coating remained it was found that it was approximately 15 microns thick which indicated that there had been no marked diffusion of aluminium into the body of the specimen.

Thus, the aluminum coating provides a measure of protection against oxidation by carbon dioxide and mixed carbon dioxide—10% carbon monoxide. It should be noted that the oxidation resistance of the nickel based alloys used in these experiments is less than that of stainless steel under the same conditions.

I claim:
1. A fuel element for a gas-cooled nuclear reactor wherein the coolant comprises carbon dioxide, said fuel element comprising a ceramic nuclear fuel material in a non-fissile metal container, said metal being selected from the group of alloys consisting of iron-based alloys and nickel-based, iron-containing alloys, and including a thin outer coating of an oxidation resistant material on said container.

2. The fuel element of claim 1 wherein the outer coating is 10–40 microns thick.

3. The fuel element of claim 1 wherein the oxidation resistant material is selected from the group consisting of aluminium, nickel, chromium and silicon.

4. The fuel element of claim 1 also including a diffusion barrier between the metal container and the outer coating.

5. A fuel element for a nuclear reactor comprising a ceramic nuclear fuel material in a container formed of a nickel-based alloy, said container having a 20 micron thick outer coating of aluminium.

References Cited

UNITED STATES PATENTS

| | | | |
|---|---|---|---|
| 2,837,818 | 6/1958 | Storchheim | 176—82 X |
| 2,969,309 | 1/1961 | Finniston et al. | 176—82 |
| 2,990,352 | 6/1961 | Finniston et al. | 176—82 |
| 3,098,024 | 7/1963 | Barney et al. | 176—82 |
| 3,184,393 | 5/1965 | Blomeyer et al. | 176—82 |
| 3,202,583 | 8/1965 | Kling et al. | 176—67 X |

FOREIGN PATENTS 670,910    9/1963    Canada.

CARL D. QUARFORTH, *Primary Examiner.*

BENJAMIN R. PADGETT, *Examiner.*

M. J. SCOLNICK, *Assistant Examiner.*